United States Patent
Tsai et al.

(10) Patent No.: US 9,151,599 B2
(45) Date of Patent: Oct. 6, 2015

(54) IMAGE SENSING MODULE ADAPTED TO COMPENSATE TEMPERATURE VARIATION

(75) Inventors: Cheng Nan Tsai, Hsin-Chu (TW); Chun Yi Lu, Hsin-Chu (TW); Hui Hsuan Chen, Hsin-Chu (TW); Hung Ching Lai, Hsin-Chu (TW); Yuan Yu Peng, Hsin-Chu (TW); Tsung Min Su, Hsin-Chu (TW); Chih Hsin Lin, Hsin-Chu (TW); Yu Chia Lin, Hsin-Chu (TW); Teng Wei Hsu, Hsin-Chu (TW); Chuan Ching Lin, Hsin-Chu (TW)

(73) Assignee: PIXART IMAGING INC., Hsin-Chu (TW)

( * ) Notice: Subject to any disclaimer, the term of this patent is extended or adjusted under 35 U.S.C. 154(b) by 974 days.

(21) Appl. No.: 13/097,821

(22) Filed: Apr. 29, 2011

(65) Prior Publication Data

US 2011/0309234 A1    Dec. 22, 2011

(30) Foreign Application Priority Data

Jun. 17, 2010   (TW) ............................. 99119821 A
Oct. 6, 2010    (TW) ............................. 99133995 A (51) Int. Cl.
```
H01L 27/00   (2006.01)
H01J 40/14   (2006.01)
G01B 11/16   (2006.01)
G01J 1/42    (2006.01)
```
(52) U.S. Cl.
CPC .............. *G01B 11/16* (2013.01); *G01J 1/4228* (2013.01)

(58) Field of Classification Search
CPC ............. G01J 5/02; G01J 1/4228; G01J 1/44; H04N 9/093; H04N 3/14; H04N 5/335; H04N 5/33; H04N 5/361; H04N 9/09; H04N 1/00031; H04N 1/00045; H04N 1/00063; H04N 1/00087; G01B 11/16
USPC .......... 250/208.1, 214 R, 206, 559.1, 559.29, 250/238, 214 C, 352, 339.03, 339.04, 250/370.15; 348/244, 263, 265, 280, 340, 348/360, 262, 279, 281, 282, 311; 345/101, 345/820; 359/279, 238, 556; 382/149
See application file for complete search history.

(56) References Cited

U.S. PATENT DOCUMENTS

| | | | |
|---|---|---|---|
| 4,774,592 A * | 9/1988 | Suzuki et al. | ................. 358/451 |
| 7,924,409 B2 * | 4/2011 | Imada | .......................... 356/3.14 |
| 2009/0237695 A1 | 9/2009 | Shinohara | |

(Continued)

FOREIGN PATENT DOCUMENTS

| | | |
|---|---|---|
| CN | 101539741 A | 9/2009 |
| JP | 2003337657 A | 11/2003 |

(Continued)

*Primary Examiner* — Que T Le
*Assistant Examiner* — Jennifer Bennett
(74) *Attorney, Agent, or Firm* — Lowe Hauptman & Ham, LLP (57) ABSTRACT

The present invention provides an image sensing module including an image sensing device and a calculation device. The image sensing device includes a plurality of pixels for acquiring an operation image containing an object image. The calculation device stores a look-up table regarding a temperature related parameter and a position deviation of the object image at each pixel associated with the temperature related parameter, and selects a deformation error from the look-up table according to the temperature related parameter corresponding to the operation image so as to correct a current position of the object image in the operation image.

7 Claims, 4 Drawing Sheets

(56) References Cited

U.S. PATENT DOCUMENTS

2010/0025122 A1 2/2010 Lin et al.
2010/0182484 A1* 7/2010 Iijima et al. .................. 348/340

FOREIGN PATENT DOCUMENTS

TW 087102990 A4 9/2000
TW 093100341 11/2004

* cited by examiner

IMAGE SENSING MODULE ADAPTED TO COMPENSATE TEMPERATURE VARIATION

CROSS REFERENCE TO RELATED APPLICATION

This application claims the priority benefit of Taiwan Patent Application Serial Number 099119821, filed on Jun. 17, 2010 and Taiwan Patent Application Serial Number 099133995, filed on Oct. 6, 2010, the full disclosure of each of the above-listed prior applications is incorporated herein by reference.

BACKGROUND

1. Field of the Invention

This invention generally relates to an image sensing module capable of compensating the deformation of the optical component and, more particularly, to an image sensing module capable of compensating the deformation of the optical component due to the variation of operation temperature.

2. Description of the Related Art

Image capturing technology is widely applied in various products such as optical touch systems, distance measuring systems or other optical applications capable of performing corresponding processes to acquired images.

Generally speaking, in addition to the image sensor, an image sensing module further includes at least one lens configured to guide external lights smoothly into a photosurface of the image sensor. However, an operation temperature of the image sensing module will change during operation due to system operation or environmental change. For example in an optical touch system, an operation temperature of the touch screen thereof will increase due to the operation of the backlight module thereof to cause an operation temperature of the image sensing module disposed on the screen surface to rise at the same time, such that optical components disposed inside the image sensing module will deform due to the temperature rise.

Figure 1:
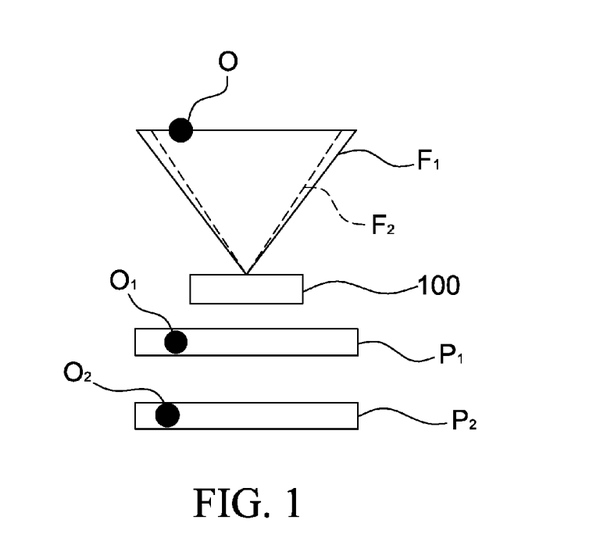
FIG. 1 shows a schematic diagram of the change of field of view of the image sensing module caused by the temperature rise of the optical component according to an embodiment of the present invention.

Please referring to FIG. 1, it shows a schematic diagram of an image sensing module influenced by the temperature variation. When an operation temperature of the image sensing module 100 changes, the optical component (not shown) of the image sensing module 100 deforms and causes the field of view (FOV) of the image sensor in the image sensing module 100 to change.

For example in FIG. 1, an FOV of the image sensing module 100 is shown as the large triangle $F_1$ at 20° C. and shown as the small triangle $F_2$ at 70° C. If an object O locates at a fixed position as shown in the figure at this moment, the image sensing module 100 can acquire a first image $P_1$ at 20° C. containing an object image $O_1$ and acquire a second image $P_2$ at 70° C. containing an object image $O_2$. As shown in FIG. 1, image positions of the object O in the first image $P_1$ and the second image $P_2$ acquired by the image sensing module 100 have a position deviation therebetween. Therefore, if the image sensing module 100 calculates an object coordinate according to the object images $O_1$ and $O_2$, different coordinates will be obtained at different operation temperatures.

Accordingly, the present invention provides an image sensing module that can eliminate or at least significantly reduce the deformation problem in the prior art caused by the temperature variation.

SUMMARY

The present invention provides an image sensing module capable of compensating the error in acquired images caused by the variation of operation temperature.

The present invention provides an image sensing module including an image sensing device and a calculation device. The image sensing device includes a plurality of pixels for acquiring an operation image containing an object image. The calculation device stores a look-up table regarding a temperature related parameter and a position deviation of the object image at each pixel associated with the temperature related parameter, and selects the position deviation from the look-up table according to the temperature related parameter corresponding to the operation image thereby correcting a current position of the object image in the operation image.

In an aspect, the image sensing module further includes a temperature sensing device for detecting an operation temperature during acquiring the operation image.

In an aspect, the temperature related parameter is an operation temperature or a position difference between a reference position and at least one pixel at which the object image locates associated with different temperatures.

The present invention provides an image sensing module including an image sensing device and a calculation device. The image sensing device acquires a background image of a reference mark having a fixed position at a first time and acquires an operation image containing the reference mark and an object image at a second time. The calculation device obtains a background position of the reference mark according to the background image, obtains an operation position of the reference mark and a detection position of the object image according to the operation image, and corrects the detection position according to a position difference between the operation position and the background position.

The present invention provides an image sensing module including an optical component, an image sensing device, a temperature sensing device and a calculation device. The optical component is configured to guide lights to the image sensing device. The image sensing device generates an operation image according to the lights received. The temperature sensing device is configured to detect an operation temperature of the image sensing module. The calculation device compensates a position deviation of an object image in the operation image caused by a variation of the operation temperature according to the operation temperature.

In the image sensing module according to an embodiment of the present invention, the look-up table includes the position deviation of the object image at each pixel associated with different operation temperatures from a reference temperature, or includes coefficients of at least one compensation function obtained according to the position deviation of the object image at each pixel associated with different operation temperatures.

In the image sensing module according to an alternative embodiment of the present invention, the look-up table includes the position deviation of the object image at each pixel associated with different position differences from the reference position, or includes coefficients of at least one compensation function obtained according to the position deviation of the object image at each pixel associated with different position differences.

BRIEF DESCRIPTION OF THE DRAWINGS

Other objects, advantages, and novel features of the present invention will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present invention provides an image sensing module having temperature compensation function that can compensate a sensing result of the image sensing module when a temperature variation causes the deformation of optical components thereof so as to eliminate the negative influence of the temperature variation on the image sensing module. The image sensing module of the present invention may be widely used in optical touch systems, distance measuring systems or other optical applications that can perform corresponding processes using acquired images.

Figure 2:
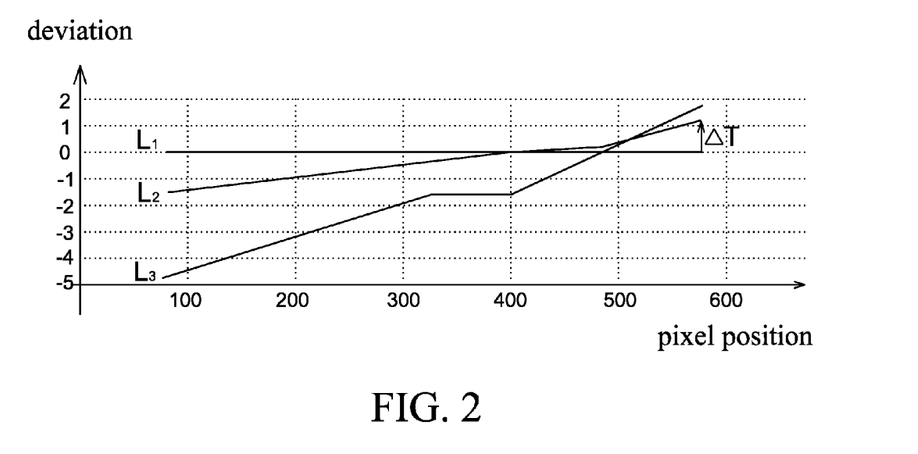
FIG. 2 shows a schematic diagram of the position deviation of the object image at each pixel associated with different operation temperatures.

Please referring to FIG. 2, it shows a schematic diagram of a position deviation of an object image at each pixel associated with different operation temperatures, wherein an X-axis denotes the pixel position of an photosensor matrix that the object image acquired by the image sensing module locates and the photosensor matrix may include, for example, 640 pixels; and a Y-axis denotes the position deviation of the object image in pixels.

In FIG. 2, $L_1$ may be the position deviation of the object image at each pixel at 0° C., wherein the object image at each pixel does not have deviation at this temperature. $L_2$ may be the position deviation of the object image at each pixel at 25° C. and $L_3$ may be the position deviation of the object image at each pixel at 70° C. As shown in FIG. 2, in the photosensor matrix of the image sensing module, when the object image is closer to the most left pixel (i.e. pixel 0) or the most right pixel (i.e. pixel 640), the object image has a larger deviation due to the temperature rise. It is appreciated that, a pixel number of the photosensor matrix and a relationship between the position deviation of the object image at each pixel associated with operation temperatures herein are only exemplary rather than limitations to the present invention.

An embodiment of the present invention uses a temperature sensing device to directly detect an operation temperature of the image sensing module and previously constructs and records a corresponding relationship between the operation temperature and the deformation of the optical component in the image sensing module. During operation, a current position of the object image in an operation image acquired by the image sensing module can be corrected directly according to a current operation temperature and the corresponding relationship. More specifically, the corresponding relationship may be constructed by setting a reference position of the object image at each pixel (e.g. $L_1$ shown in FIG. 2) at a reference temperature (for example, but not limited to, 0° C.) and recording a deformation error of the object image at each pixel from the reference position associated with different operation temperatures.

Please referring to FIGS. 3A-3D, they respectively show a system diagram of the image sensing module according to the embodiment of the present invention. The image sensing module 200 includes an image sensing device 210, an optical component 220 and a calculation device 230. The image sensing device 210 may be a CCD image sensor, a CMOS image sensor or other image sensors for acquiring images. The optical component 220 may be made of a suitable material and configured to guide external lights to a photosensor matrix of the image sensing device 210 such that the image sensing device 210 may receive lights and generate images. The calculation device 230 retrieves object information from the images and provides the information to a system to which the image sensing module applied for post-processing, such as a coordinate of the object may be calculated according to the object information in an optical touch system.

In the embodiment using the operation temperature as a correction reference, the image sensing module 200 may further include a temperature sensing device 240 for detecting a current operation temperature, such that the calculation device 230 may compensate the position deviation of the images acquired by the image sensing module 200 caused by the deformation of the optical component 220 due to the temperature variation according to the current operation temperature detected. In an embodiment, a corresponding relationship between the operation temperature and the deformation of the optical component 220 may be previously constructed and recorded. For example, a deformation error of the object image at each pixel from a reference position (e.g. a position difference of each pixel of $L_2$, $L_3$ from $L_1$ shown in FIG. 2) in the images acquired by the image sensing device 210 may be previously measured every 5° C. from 20° C. to 70° C. so as to construct a plurality of look-up tables, wherein the reference position may be defined as a position of the object image at each pixel at 20° C. In the look-up table, the deformation error of the object image at each pixel may be served as the corresponding relationship between a position deviation of the object image at each pixel and an influence on the object image due to the deformation of the optical component associated with different temperatures. It is appreciated that, a number of the look-up tables may be determined by the precision to be compensated.

Each look-up table may include a position deviation of the image object at each pixel, or coefficients of at least one one-dimensional, two-dimensional or multiple-dimensional compensation function obtained according to the position deviation at one operation temperature with respect to the reference temperature. For example, the coefficients may be $(a_1, b_1)$ of the one-dimensional compensation function $a_1x+b_1$ or may be $(a_2, b_2, c_2)$ of the two-dimensional compensation function $a_2x^2+b_2x+c_2$. A merit to record only coefficients of the compensation function is to reduce an amount of data to be stored previously. For example, it is able to determine coefficients (e.g. the slop) of at least one compensation function according to position deviations of the object image at a center pixel and two edge pixels of the plurality of pixels, and then save the slope associated with different temperatures in the look-up table previously.

More specifically, when the image sensing device 210 acquires an operation image containing an object image, the temperature sensing device 240 detects a current operation temperature simultaneously. Then the calculation device 230 may directly read the position deviation of the object image at each pixel from the look-up table or may read the coefficients of a corresponding compensation function from the look-up table to accordingly calculate the position deviation of the object image at each pixel so as to determine a deformation error thereby correcting a current position of the object image in the operation image.

Figure 3A:
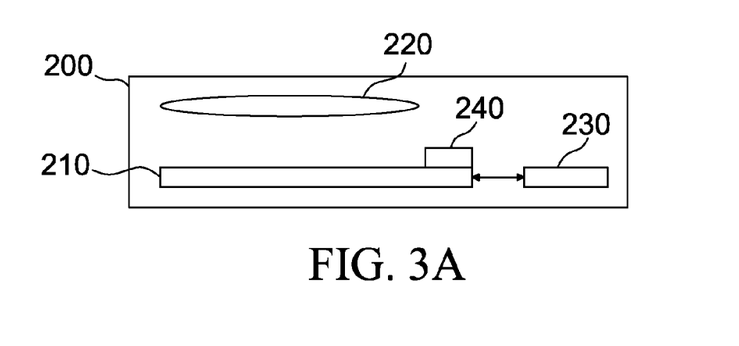
FIGS. 3A-3D respectively shows a block diagram of the image sensing module according to an embodiment of the present invention.
Figure 3B:
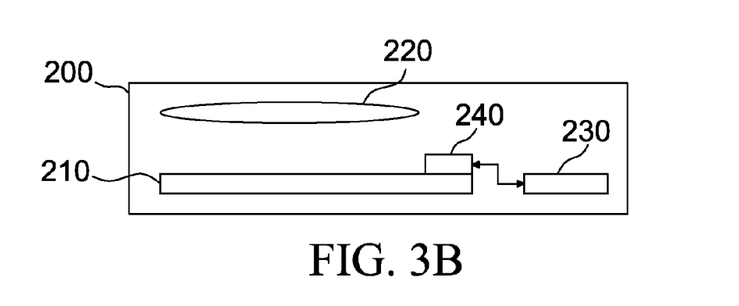
Figure 3C:
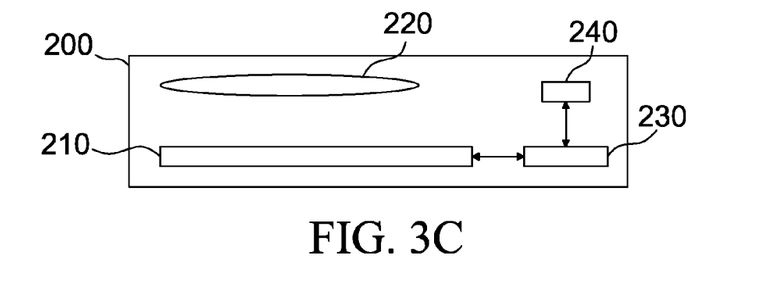
Figure 3D:
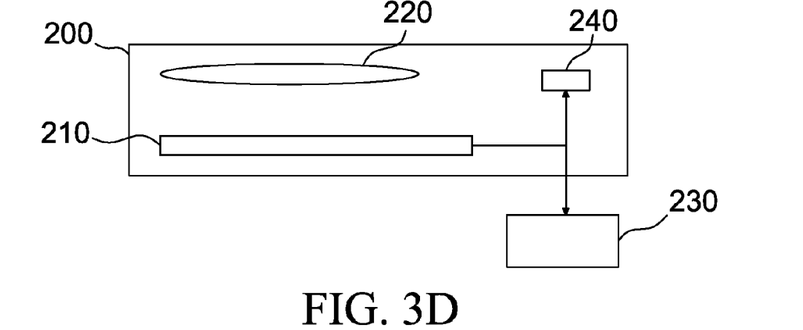

It should be noted that FIGS. 3A-3C are to show different embodiments of the connection of components included in the image sensing module 200, wherein a temperature sensing device 240 is disposed inside the image sensing module 200. For example in FIG. 3A, the image sensing device 210 is coupled between the temperature sensing device 240 and the calculation 230; in FIG. 3B the temperature sensing device 240 is coupled between the image sensing device 210 and the calculation device 230; and in FIG. 3C the calculation device 230 is coupled between the image sensing device 210 and the temperature sensing device 240. In addition, FIG. 3D shows an embodiment in which the calculation device 230 is disposed outside the image sensing module 200. In another embodiment, the temperature sensing device 240 may be built-in the image sensing device 210.

Taking an optical touch system as an example, the image sensing module 200 may utilize the temperature sensing device 240 to detect an operation temperature, then determine a look-up table according to the operation temperature, and then calculate a corrected position $X_1$ of the object image, which is the position of the object image after the deformation of the optical component being compensated, using equation (1) according to a deformation error $\Delta t$ (i.e. position deviation) selected from the look-up table and a detection position $X_0$ of the object image in an operation image acquired by the image sensing device 210 of the image sensing module 200 during operation, $$X_1 = X_0 + \Delta t \tag{1}$$

In another embodiment, the present invention further can correct acquired images without detecting a current operation temperature. In this embodiment, when the image sensing module has at least one reference mark having a fixed position, the image sensing module may acquire a background image containing an image of the reference mark at a reference temperature (e.g. 0° C. or 20° C.), and obtains a background position of the reference mark and a reference position of the object image at each pixel according to the background image. The image sensing module further acquires a position difference between a position of the reference mark and the background position at different temperatures and acquires a position deviation, which may preset before shipment of the system adopting the image sensing module, of the object image at each pixel from the reference position. During operation, the image sensing module may obtain an operation position of the reference mark from an operation image acquired and accordingly calculate a position difference between the operation position and the background position so as to further obtain the deformation of the optical component and the corresponding deformation error of the object image at each pixel according to the position difference thereby correcting a current position of the object image in the operation image.

In other words, for example the calculation device 230 previously stores a look-up table including, corresponding to different position differences between the background position and the operation position, the position deviation of the object image at each pixel from the reference position or coefficients of at least one one-dimensional, two-dimensional or multiple-dimensional compensation function obtained according to the position deviation. The calculation device 230 compensates the operation image based on the look-up table according to the position difference between the background position and the operation position during operation. More specifically, the difference between this embodiment and the previous embodiment is that, in this embodiment the image sensing module 200 does not need to include the temperature sensing device 240 to detect a current operation temperature and uses a position difference between the background position and the operation position to replace the actual measurement of the current temperature. Since this embodiment directly uses the position difference between the background position and the operation position as a reference for compensation, higher precision can be realized.

In a word, the present invention previously constructs a look-up table regarding a temperature related parameter and a position deviation of an object image at each pixel associated with the temperature related parameter and saves the look-up table in the image sensing module, and then compensates the object image in an operation image according the corresponding temperature related parameter during operation and the look-up table, wherein the temperature related parameter may be an operation temperature or a position difference between the operation position of a reference mark and the background position, but the present invention is not limited to these.

In addition, the present embodiment may select the look-up table during operation according to the position difference between operation positions of more than one reference mark and the background position in the image (such as the maximum position deviation at the most left pixel and the most right pixel shown in FIG. 2) to increase the precision of selecting compensation reference. In addition, sometimes a compensation function of the whole image can not be represented by a simplified compensation function, and thus a plurality of compensation functions may be used to represent different sections of the image. For example, the image mat be divided by the center pixel into two sections each being represented by one compensation function.

Figure 4A:
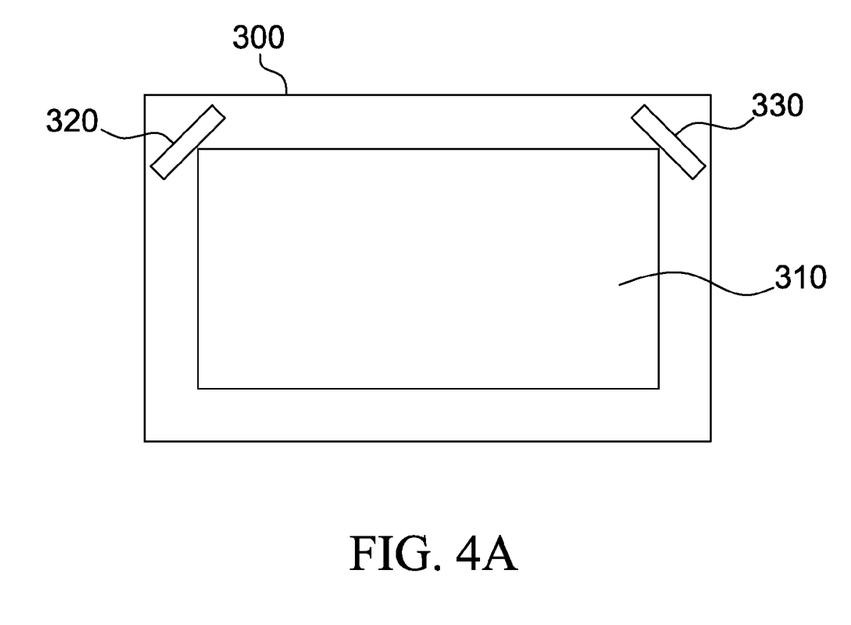
FIGS. 4A-4B respectively shows a system diagram of the optical touch system according to an embodiment of the present invention.
Figure 4B:
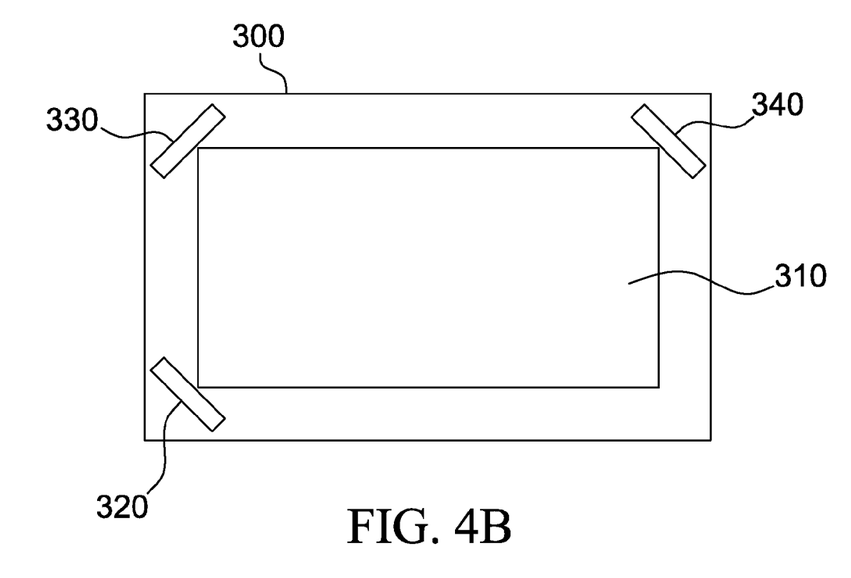

Please referring to FIGS. 4A and 4B, they show two embodiments of the optical touch system to which the image sensing module is applied. In FIG. 4A, an optical touch system 300 includes a touch plane 310 and two image sensing modules 320 and 330. In FIG. 4B, the optical touch system 300 includes the touch plane 310 and three image sensing module 320, 330 and 340. Each image sensing module 320, 330 and 340 includes an image sensing device, an optical component and at least one illumination device (not shown), such as a light emitting diode or a laser diode and preferably an invisible light emitting diode or laser diode emitting invisible lights. In addition, if the image sensing modules 320, 330 and 340 include a temperature sensing device, they may not include the illumination device.

In FIG. 4A, when the image sensing module 320 is acquiring the image of at least one object, the illumination device of the image sensing module 330 emits lights simultaneously. The image sensing module 320 then acquires an image containing the object and the illumination device of the image sensing module 330. Therefore, the image sensing module 330 (or the illumination device thereof) may be served as a reference mark to the image sensing module 320, and oppositely the image sensing module 320 (or the illumination device thereof) may be served as a reference mark to the image sensing module 330. Similarly in FIG. 4B, the image sensing module 330 (or the illumination device thereof) may be served as a reference mark to the image sensing module 340.

Figure 5:
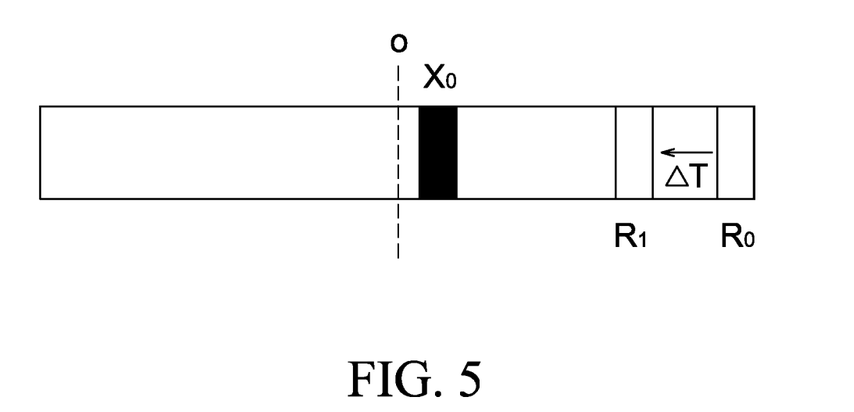
FIG. 5 shows a schematic diagram of the reference position of a reference mark, a background position and the detection position of an object image according to the embodiment of the present invention.

Please referring to FIGS. 4 and 5, another embodiment of the present invention capable of compensating the position deviation of the object image due to the temperature variation will be illustrated hereinafter. Taking the image sensing module 320 as an example, before shipment the image sensing module 320 has acquired a background image containing the image sensing module 330 and recorded a position of the image sensing module 330 in a background image as a background position $R_0$ as FIG. 5. When the image sensing module 320 acquires an operation image containing an object and the image sensing module 330 during operation, the image sensing module 320 may calculate a detection position $X_0$ of the object in the operation image and an operation position $R_1$ of the image sensing module 330 in the operation image. It is appreciated that, for clearly showing a position difference between the background position $R_0$ and the operation position $R_1$, a distance between the background position $R_0$ and the operation position $R_1$ is adjusted in FIG. 5.

As the object in the image acquired by the image sensing module 320 shows a dark area and the illumination device of the image sensing module 330 shows a bright area in the image acquired by the image sensing module 320, the operation position $R_1$ of the image sensing module 330 and the detection position of the object $X_0$ may be respectively retrieved from two images acquired within a period of time by the image sensing module 320. That is, the operation position $R_1$ and the detection position $X_0$ may be retrieved from different images.

As an image position of the image sensing module 330 is close to the most right pixel (i.e. the maximum pixel) of the image acquired by the image sensing module 320, a deviation of the image position of the image sensing module 330 (i.e. a position difference between the operation position $R_1$ and the background position $R_0$) may be served as a maximum deformation error $\Delta T$ that the image sensing module 320 can have during operation. As shown in FIG. 2, the position deviation is different when the object image is at different pixels. The maximum deformation error $\Delta T$ may be multiplied by a deformation ratio "m" so as to calculate the deformation error $\Delta t$ of the object image at each pixel. By using the deformation error $\Delta t$ to compensate the detection position $X_0$ of the object image acquired by the image sensing module 320, a corrected position $X_1$ of the object image may be calculated according to equation (1).

Please referring to FIGS. 2 and 5 again, as the deviation is smallest at about the center pixel of the plurality of pixels of the image sensing module 320 and is largest at the maximum pixel and/or the minimum pixel, the deformation ratio "m" may be determined according to the detection position $X_0$ of the object image at the plurality of pixels of the image sensing module 320.

For example in FIG. 2, a variation between the approximate center pixel to the maximum pixel may be simplified to a linearly increasing function and a variation between the approximate center pixel to the minimum pixel may be simplified to a linearly decreasing function. Therefore, a predetermined pixel of the image sensing module 320 (for example, but not limited to, the center pixel) may be set as a reference point O as shown in FIG. 5 so as to calculate a ratio of a distance between the image position of the object in the image sensing module 320 and the reference point O with respect to a distance between a maximum touch position and the reference point O to be severed as the deformation ratio "m", e.g. $m=(X_0-O)/(R_1-O)$. In the optical touch system 300, the maximum touch position of the image sensing module 320 may be an edge close to the image sensing module 330 on the touch plane 310. More specifically, in this embodiment a look-up table is not necessary to be previously stored. The deformation ratio "m" can be obtained merely according to a maximum deformation error $\Delta T$ obtained according to a previously stored background position (e.g. only one or two maximum deformation errors between two edge pixels and the approximate center pixel are calculated) in conjunction with a reference point O as well as the detection position $X_0$ of the object image.

Thus, in the operation image acquired by the image sensing module 320 during operation, the corrected position $X_1$ of the object may be represented as:

$$X_1 = X_0 + \Delta t = X_0 + \Delta T^*[(X_0-O)/(R_1-O)]$$

The calculation of an image position of the object in the images acquired by the image sensing modules 330 and 340 may use the correction method similar to the image sensing module 320, and thus details will not be repeated herein.

The image sensing module capable of compensating the deformation of optical component of the present invention may be widely applied to optical touch systems, distance measuring systems and other optical applications capable of performing corresponding processes to acquired images. Although an optical touch system is used an example for illustration in the above embodiments, a person skilled in the art can directly apply the image sensing module of the present invention to various optical applications after appreciating the illustrations of the above embodiments of the present invention, and thus details of other applications will not be repeated herein.

What is claimed is:

1. An image sensing module, comprising:
    an image sensing device configured to acquire an operation image containing an object image, wherein the operation image has a plurality of pixels; and
    a calculation device configured to
        store a look-up table regarding a temperature related parameter and a position deviation of the object image at each of all the plurality of pixels associated with the temperature related parameter, wherein the temperature related parameter comprises a position difference between at least one reference position and at least one pixel at which the object image locates corresponding to different temperatures,
        select the position deviation from the look-up table according to the temperature related parameter corresponding to a current position difference of the object image obtained from the acquired operation image, and
        correct a current position of the object image in the operation image according to the selected position deviation.

2. The image sensing module as claimed in claim 1, wherein the at least one pixel is an edge pixel or a center pixel of the plurality of pixels.

3. The image sensing module as claimed in claim 1, wherein the at least one reference position is a pixel position at which the object image locates corresponding to a reference temperature.

4. The image sensing module as claimed in claim 3, wherein the look-up table comprises
    the position deviation of the object image at each of all the plurality of pixels associated with different position differences from the reference position.

5. An image sensing module, comprising:
    an image sensing device configured to acquire an operation image containing an object image, wherein the operation image has a plurality of pixels; and a calculation device configured to
- store coefficients of at least one compensation function obtained according to a position deviation of the object image at each of all the plurality of pixels associated with a temperature related parameter, wherein the temperature related parameter comprises a position difference between at least one reference position and at least one pixel at which the object image locates corresponding to different temperatures;
- select the coefficient according to the temperature related parameter corresponding to a current position difference of the object image obtained from the acquired operation image; and
- correct a current position of the object image in the operation image according to the selected coefficient.

6. The image sensing module as claimed in claim 5, wherein the compensation function is a one-dimensional function determined by the position deviation of the object image at a center pixel and an edge pixel of the plurality of pixels associated with different position differences.

7. The image sensing module as claimed in claim 5, further comprising an optical component configured to guide lights to the image sensing device, wherein the operation image is generated according to light received by the image sensing device.

* * * * *